(12) United States Patent
Haryu et al.

(10) Patent No.: US 10,053,783 B2
(45) Date of Patent: Aug. 21, 2018

(54) DIFFERENTIAL PRESSURE WATER ELECTROLYSIS SYSTEM

(71) Applicant: HONDA MOTOR CO., LTD., Tokyo (JP)

(72) Inventors: Eiji Haryu, Wako (JP); Nobuyuki Kawasaki, Wako (JP); Hiroyuki Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 14/836,958

(22) Filed: Aug. 27, 2015

(65) Prior Publication Data
US 2016/0060771 A1   Mar. 3, 2016

(30) Foreign Application Priority Data

Aug. 27, 2014 (JP) .................. 2014-173132

(51) Int. Cl.
| | |
|---|---|
| *C25B 9/06* | (2006.01) |
| *C25B 9/00* | (2006.01) |
| *C25B 11/03* | (2006.01) |
| *C25B 1/12* | (2006.01) |
| *C25B 1/10* | (2006.01) |
| *C25B 1/08* | (2006.01) |
| *C25B 9/20* | (2006.01) |
| *C25B 13/08* | (2006.01) |
| *C25B 9/08* | (2006.01) |
| *C25B 13/02* | (2006.01) |

(52) U.S. Cl.
CPC .................. *C25B 1/12* (2013.01); *C25B 1/08* (2013.01); *C25B 1/10* (2013.01); *C25B 9/08* (2013.01); *C25B 9/20* (2013.01); *C25B 13/02* (2013.01); *C25B 13/08* (2013.01); *Y02E 60/366* (2013.01)

(58) Field of Classification Search
CPC .... C25B 9/08; C25B 9/06; C25B 1/02; C25B 9/00; C25B 9/18; C25B 11/03
USPC .................................................. 204/242, 253
See application file for complete search history.

(56) References Cited

U.S. PATENT DOCUMENTS

| | | | | |
|---|---|---|---|---|
| 2008/0090140 A1* | 4/2008 | Dalton | .................. | H01M 8/241 429/160 |
| 2015/0114831 A1* | 4/2015 | Kawasaki | ................. | C25B 9/10 204/252 |

FOREIGN PATENT DOCUMENTS

JP       2012-087403       5/2012

* cited by examiner

*Primary Examiner* — Zulmariam Mendez
(74) *Attorney, Agent, or Firm* — Mori & Ward, LLP

(57) ABSTRACT

A differential pressure water electrolysis system includes high pressure water electrolysis cells stacked and fastened in a stacking direction. Each of the high pressure water electrolysis cells includes an electrolyte membrane, an anode feed conductor, a cathode feed conductor, an anode separator, a cathode separator, an elastic member, a hydrogen manifold, a conductive member, a sealing member, a conductive sheet, and an insulation member. The conductive member is disposed between the cathode separator and the electrolyte membrane to provide the hydrogen manifold. The conductive sheet is disposed so as to extend from a first portion between the conductive member and the electrolyte membrane to a second portion between the cathode feed conductor and the elastic member. The insulation member is disposed in a center portion of the cathode feed conductor and between the conductive sheet and the electrolyte membrane.

16 Claims, 5 Drawing Sheets

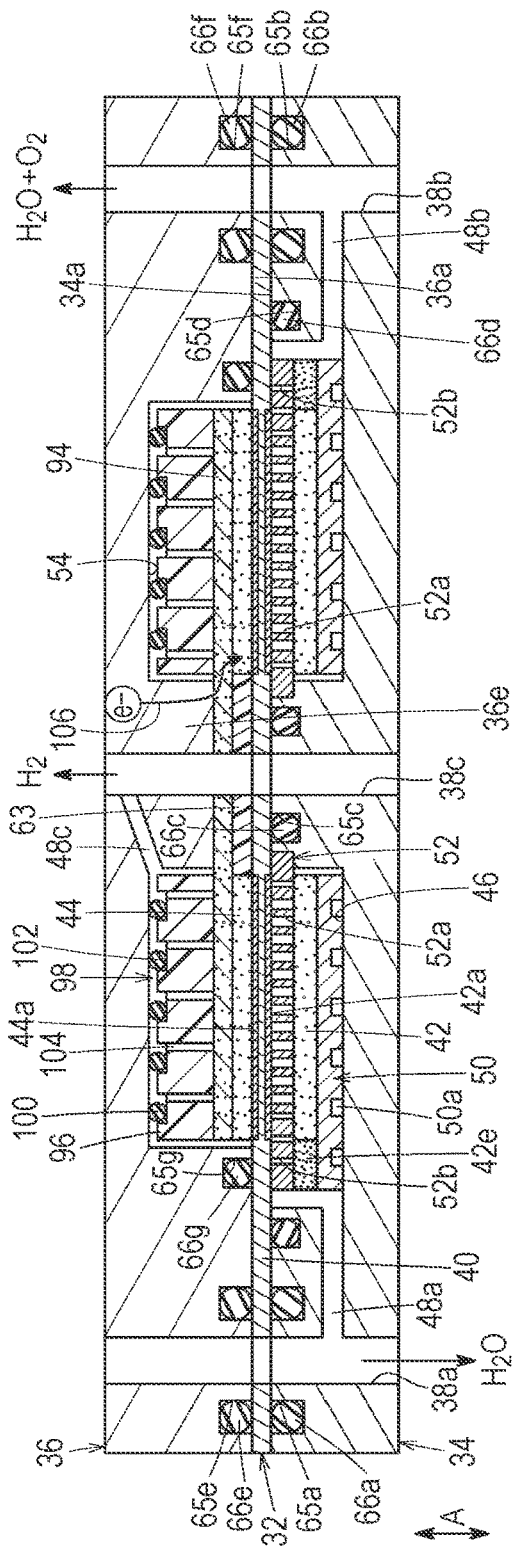

DIFFERENTIAL PRESSURE WATER ELECTROLYSIS SYSTEM

CROSS-REFERENCE TO RELATED APPLICATIONS

The present application claims priority under 35 U.S.C. § 119 to Japanese Patent Application No. 2014-173132, filed Aug. 27, 2014, entitled "Differential Pressure Water Electrolysis System." The contents of this application are incorporated herein by reference in their entirety.

BACKGROUND

1. Field

The present disclosure relates to a differential pressure water electrolysis system.

2. Description of the Related Art

Hydrogen gas is used as a fuel gas for a fuel cell to generate electricity, for example. A water electrolyzer is typically employed when producing hydrogen gas. The water electrolyzer uses a solid polymer electrolyte membrane for generating hydrogen (and oxygen) through electrolysis of water. An electrode catalyst layer is provided on both surfaces of the solid polymer electrolyte membrane such that an electrolyte membrane-electrode structure is configured, and a feed conductor is disposed on both sides of the electrolyte membrane-electrode structure such that a unit is configured.

While in a state in which a plurality of units are stacked, voltage is applied to both ends in the stacking direction and water is supplied to an anode feed conductor. Accordingly, water is electrolyzed and hydrogen ions (protons) are generated on the anode side of the electrolyte membrane-electrode structure, the hydrogen ions permeate the solid polymer electrolyte membrane and move to the cathode side, and the hydrogen ions are combined with the electrons such that hydrogen is produced. Meanwhile, on the anode side, oxygen that has been generated together with hydrogen is discharged from the unit along with surplus water.

In the above type of water electrolyzer, they are cases in which a high pressure water electrolyzer (a differential pressure water electrolysis system) that produces, by electrolyzing water, oxygen and hydrogen that has a pressure that is higher than that of the oxygen is employed. In such a case, a disk spring (an elastic member), for example, is used as a compression member on the cathode side on which high pressure hydrogen is generated while the disk spring constitutes a conduction passage. Accordingly, the contact area between the components that configure the conduction passage may disadvantageously become small disadvantageously causing the components to be deteriorated easily.

A high pressure water electrolyzer disclosed in Japanese Unexamined Patent Application Publication No. 2012-87403, for example, is known. The above high pressure water electrolyzer includes a conductive sheet that is integrally interposed across a portion between a cathode separator and an elastic member to a portion between a plate member and a cathode feed conductor and that includes a conduction passage that electrically connects the cathode separator to the cathode feed conductor.

SUMMARY

According to one aspect of the present invention, a differential pressure water electrolysis system includes a high pressure water electrolysis cell, a conductive member, a sealing member, a conductive sheet, and an insulation member. The high pressure water electrolysis cell includes an electrolyte membrane, an anode feed conductor, a cathode feed conductor, an anode separator, and a cathode separator. The anode feed conductor is provided on one side and the cathode feed conductor is provided on the other side of the electrolyte membrane. The anode separator is disposed so as to oppose the anode feed conductor. The anode separator is provided with an anode chamber in which the anode feed conductor is accommodated and generates oxygen by electrolyzing water that has been supplied thereto. The cathode separator is disposed so as to oppose the cathode feed conductor. The cathode separator is provided with a cathode chamber in which the cathode feed conductor is accommodated and, by electrolysis of the water, generates hydrogen that has a pressure that is higher than that of the oxygen. The elastic member is disposed between the cathode feed conductor and the cathode separator and applies a load in a stacking direction. The hydrogen manifold through which the hydrogen flows is formed in the high pressure water electrolysis cell by penetrating center portions of the anode feed conductor and the cathode feed conductor. a plurality of the high pressure water electrolysis cells are stacked and fastened in a stacking direction. The conductive member forms the hydrogen manifold and is disposed between the cathode separator and the electrolyte membrane. The sealing member is disposed so as to encircle and seal the cathode chamber. The conductive sheet is disposed so as to extend from a portion between the conductive member and the electrolyte membrane to a portion between the cathode feed conductor and the elastic member in an integrated manner. The insulation member is disposed in the center portion of the cathode feed conductor and between the conductive sheet and the electrolyte membrane.

According to another aspect of the present invention, a differential pressure water electrolysis system includes high pressure water electrolysis cells stacked and fastened in a stacking direction. Each of the high pressure water electrolysis cells includes an electrolyte membrane, an anode feed conductor, a cathode feed conductor, an anode separator, a cathode separator, an elastic member, a hydrogen manifold, a conductive member, a sealing member, a conductive sheet, and an insulation member. The electrolyte membrane has a first side and a second side opposite to the first side in the stacking direction. The anode feed conductor is provided on the first side of the electrolyte membrane. The cathode feed conductor is provided on the second side of the electrolyte membrane. The anode separator is disposed so as to face the anode feed conductor and has an anode chamber in which the anode feed conductor is accommodated and oxygen is generated via electrolysis of water that has been supplied into the anode chamber. The cathode separator is disposed so as to face the cathode feed conductor and has a cathode chamber in which the cathode feed conductor is accommodated and hydrogen that has a pressure higher than a pressure of the oxygen is generated via the electrolysis of the water. The elastic member is disposed between the cathode feed conductor and the cathode separator to apply a load in the stacking direction. The hydrogen flows through the hydrogen manifold and the hydrogen manifold extends through center portions of the anode feed conductor and the cathode feed conductor. The conductive member is disposed between the cathode separator and the electrolyte membrane to provide the hydrogen manifold. The sealing member is disposed so as to encircle and seal the cathode chamber. The conductive sheet is disposed so as to extend from a first portion between the conductive member and the electrolyte membrane to a second portion between the cathode feed conductor and the elastic member. The insulation member is disposed in the center portion of the cathode feed conductor and between the conductive sheet and the electrolyte membrane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is an explanatory drawing illustrating a sectional view of an essential portion of a high pressure water electrolysis cell that constitutes a differential pressure water electrolysis system according to a third exemplary embodiment of the present disclosure.

DESCRIPTION OF THE EMBODIMENTS

Figure 1:
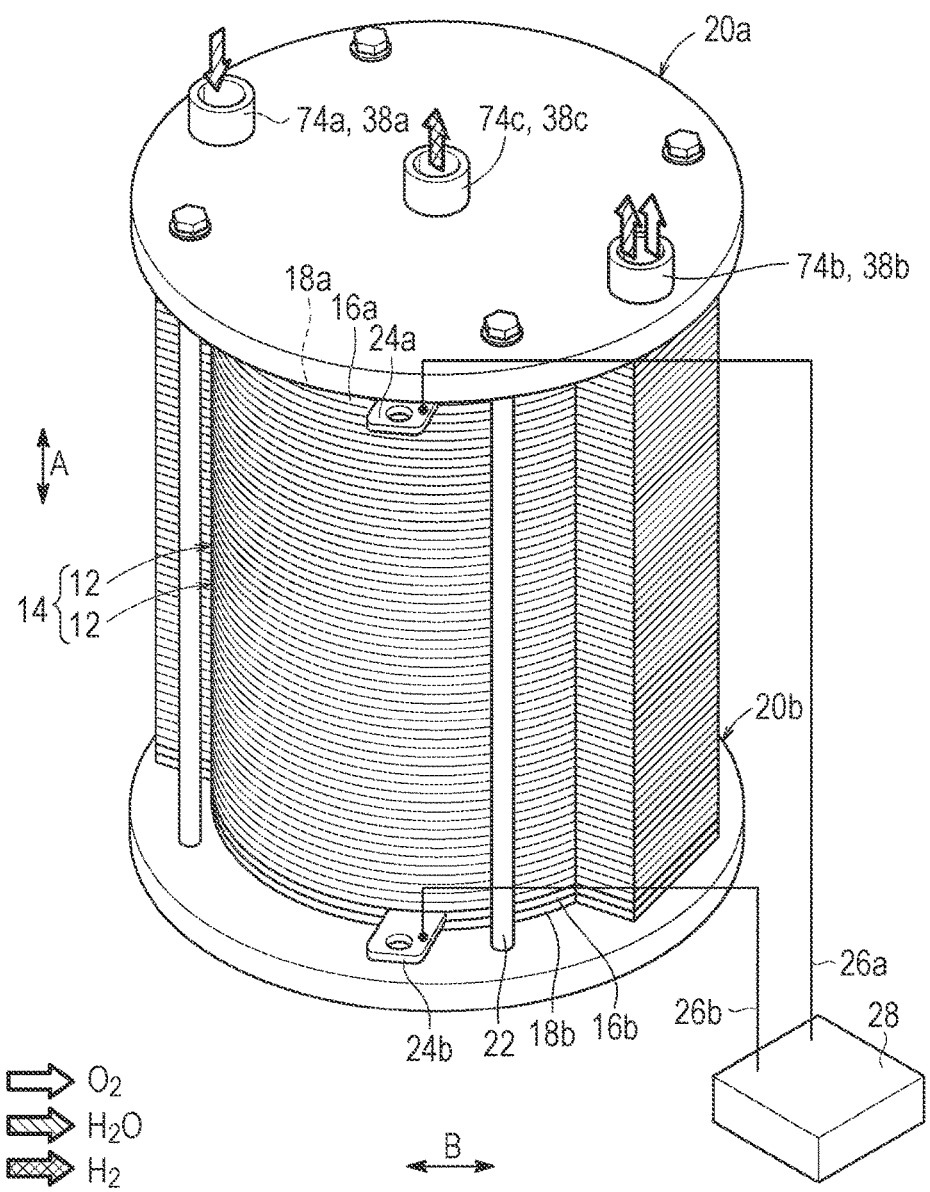
FIG. 1 is a perspective view for describing a differential pressure water electrolysis system according to a first exemplary embodiment of the present disclosure.

The embodiments will now be described with reference to the accompanying drawings, wherein like reference numerals designate corresponding or identical elements throughout the various drawings.

As illustrated in FIG. 1, a differential pressure water electrolysis system 10 according to a first exemplary embodiment of the present disclosure includes a fuel cell stack 14 that is a plurality of high pressure water electrolysis cells 12 stacked in the vertical direction (arrow A direction) or the horizontal direction (arrow B direction).

A terminal plate 16a, an insulation plate 18a, and an end plate 20a are sequentially disposed upwards at one end (an upper end) of the fuel cell stack 14 in the stacking direction. A terminal plate 16b, an insulation plate 18b, and an end plate 20b are sequentially disposed downwards at the other end (a lower end) of the fuel cell stack 14 in the stacking direction.

A portion between the disc shaped end plates 20a and 20b is fastened and held in an integrated manner with four tie rods 22 that extend in the arrow A direction, for example, such that the differential pressure water electrolysis system 10 is fastened in the stacking direction. Note that the differential pressure water electrolysis system 10 may employ a configuration in which the differential pressure water electrolysis system 10 is held in an integrated manner with a box-shaped casing (not shown) including the end plates 20a and 20b as the end plates. Furthermore, while the overall differential pressure water electrolysis system 10 has a substantially columnar shape, the differential pressure water electrolysis system 10 may be configured in various shapes, such as a rectangular parallelepiped shape.

Side portions of the terminal plates 16a and 16b are provided with terminals 24a and 24b that protrude outwards.

The terminals 24a and 24b are electrically connected to the electrolysis power source 28 through wiring 26a and 26b, respectively.

Figure 2:
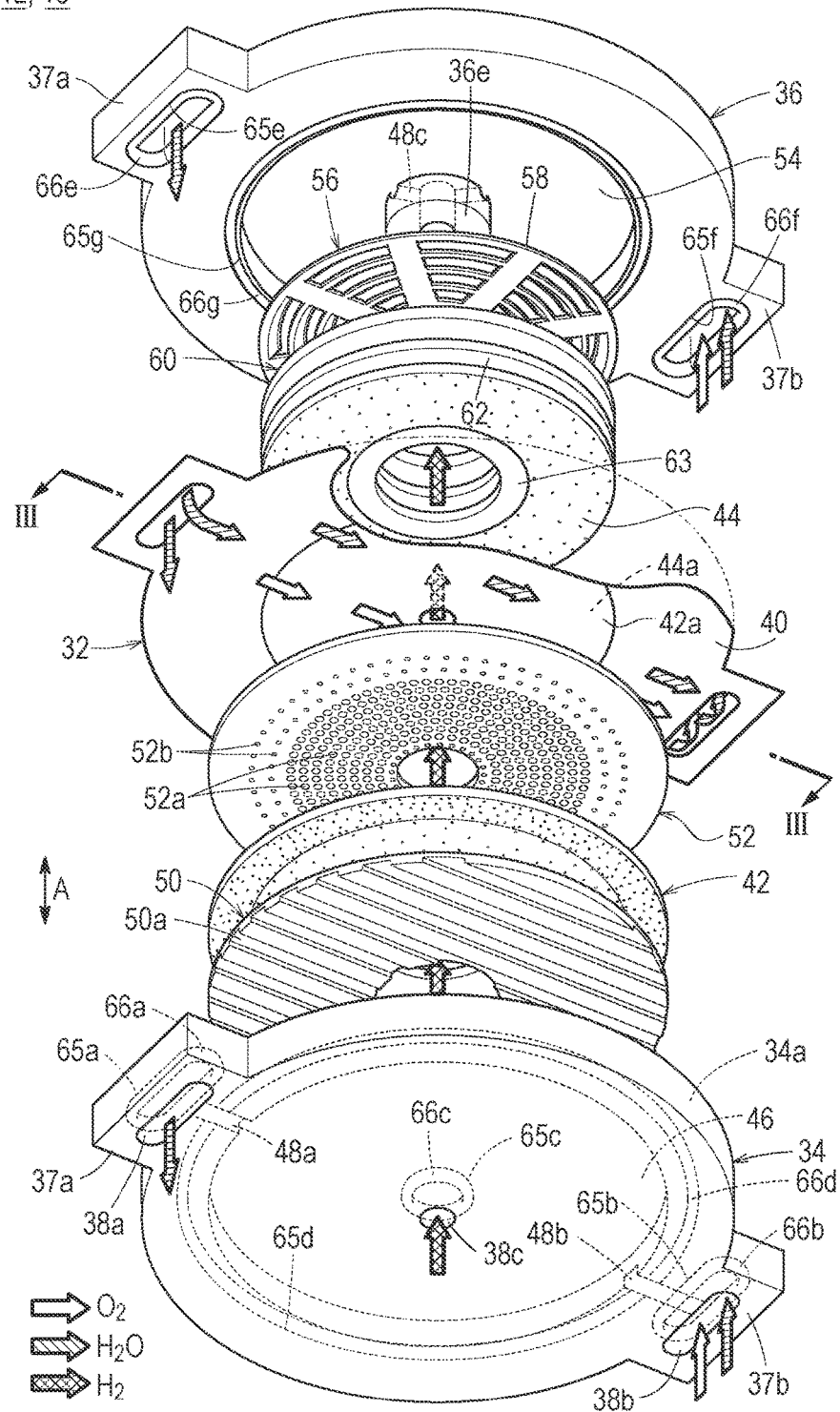
FIG. 2 is an exploded perspective view for describing a high pressure water electrolysis cell constituting the differential pressure water electrolysis system.
Figure 3:
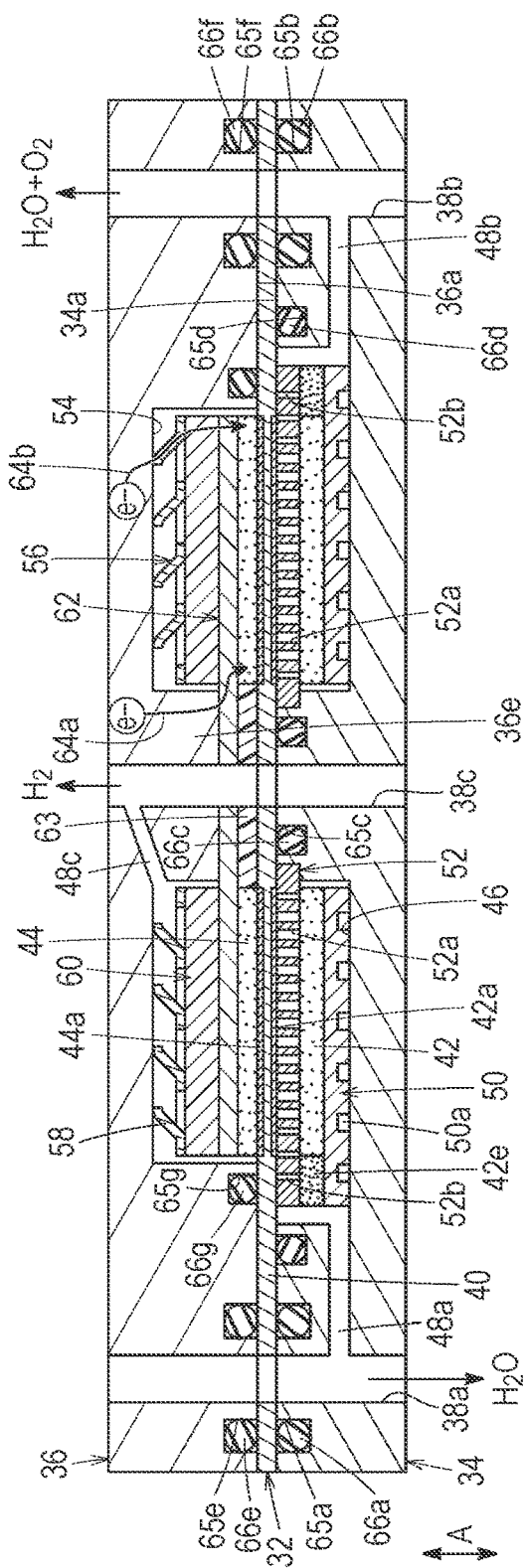
FIG. 3 is a cross-sectional view of the high pressure water electrolysis cell taken along line in FIG. 2.

As illustrated in FIGS. 2 and 3, each high pressure water electrolysis cell 12 includes a substantially discoidal electrolyte membrane-electrode structure 32, and an anode separator 34 and a cathode separator 36 that holds the electrolyte membrane-electrode structure 32 therebetween.

As illustrated in FIG. 2, first projections 37a and second projections 37b that project towards the outside in the separator surface direction and in opposite directions with respect to each other are provided in the outer peripheral edge portion of the high pressure water electrolysis cell 12. Water supplying manifolds 38a that are in communication with each other in the stacking direction (the arrow A direction) for supplying water (pure water) are provided in the first projections 37a. Water discharging manifolds 38b that are in communication with each other in the stacking direction for discharging oxygen that has been generated by reaction and unreacted water (a fluid mixture) are provided in the second projections 37b.

High pressure hydrogen manifolds 38c that are in communication with each other and that penetrate the substantially center of the electrolysis area are provided in the center portion of the high pressure water electrolysis cell 12 (see FIGS. 2 and 3). The high pressure hydrogen manifolds 38c discharge high pressure hydrogen that has been generated by reaction (hydrogen that is higher in pressure then the pressure of the generated oxygen) (1 MPa to 70 MPa, for example).

The anode separator 34 and the cathode separator 36 each have a substantially disc shape and are each constituted by, for example, a carbon member. Other than the carbon member, the anode separator 34 and the cathode separator 36 may be formed by pressing working a steel plate, a stainless steel plate, a titanium plate, an aluminum plate, a plated steel plate, or a metal plate on which anticorrosive surface treatment has been applied to its metal surface. Alternatively, anticorrosive surface treatment may be applied after machining has been performed.

The electrolyte membrane-electrode structure 32 includes a solid polymer electrolyte membrane (an electrolyte membrane) 40 that has a substantially ring shape. The solid polymer electrolyte membrane 40 is held between an anode feed conductor 42 and a cathode feed conductor 44 that are for electrolysis having a ring shape. The solid polymer electrolyte membrane 40 is configured of a hydrocarbon (HC)-based membrane or a fluorine-based membrane, for example.

The high pressure hydrogen manifold 38c is formed in a substantially center portion of the solid polymer electrolyte membrane 40. An anode electrode catalyst layer 42a that has a ring shape is provided on one surface of the solid polymer electrolyte membrane 40. A cathode electrode catalyst layer 44a that has a ring shape is formed on the other surface of the solid polymer electrolyte membrane 40. The anode electrode catalyst layer 42a uses a ruthenium (Ru)-based catalyst, for example, and the cathode electrode catalyst layer 44a uses a platinum catalyst, for example.

The anode feed conductor 42 and the cathode feed conductor 44 are each constituted by a spherical gas atomizing titanium powder sintered compact (porous conductor), for example. The anode feed conductor 42 and the cathode feed conductor 44 are each provided with a smooth surface portion on which etching process has been performed after grinding. The porosities of the node feed conductor 42 and the cathode feed conductor 44 are set within the range of 10% to 50%, more preferably, 20% to 40%. A frame portion 42e is fitted to the edge portion of the anode feed conductor 42. The frame portion 42e is finer than the anode feed conductor 42. Note that by having the outer peripheral portion of the anode feed conductor 42 be formed in a fine manner, the outer peripheral portion may be made to serve as the frame portion 42e.

An anode chamber 46 is formed in the surface 34a of the anode separator 34 that faces the electrolyte membrane-electrode structure 32 by forming a ring-shaped recess in the surface 34a. A supply passage 48a that is in communication with the water supplying manifold 38a and a discharge passage 48b that is in communication with the water discharging manifold 38b are in communication with the anode chamber 46.

A water flow path member 50 is disposed on a surface of the anode feed conductor 42 that faces the bottom surface of the anode chamber 46. Water flow paths 50a that are in communication with the supply passage 48a and the discharge passage 48b are provided in the water flow path member 50. The water flow paths 50a are, in FIG. 2, constituted by a plurality of groove portions that extend in the horizontal direction and in a parallel manner with respect to each other.

The anode feed conductor 42 and a ring-shaped protection sheet member 52 that is interposed between the anode feed conductor 42 and the solid polymer electrolyte membrane 40 are disposed in the anode chamber 46. The inner peripheral position of the protection sheet member 52 is disposed on the inner side with respect to the inner peripheral positions of the anode feed conductor 42 and the cathode feed conductor 44, and the outer peripheral position of the protection sheet member 52 extends to the vicinity of an outer peripheral position of a seventh seal groove 65g described later.

The protection sheet member 52 includes a plurality of first through holes 52a that are provided in an area opposing the anode electrode catalyst layer 42a in the stacking direction, and a plurality of second through holes 52b that are provided on the outer side with respect to the first through holes 52a. The arrangement density of each of the first through holes 52a is higher than the arrangement density of each of the second through holes 52b, and the opening diameter of each of the first through holes 52a is larger than the opening diameter of each of the second through holes 52b.

As illustrated in FIGS. 2 and 3, in a surface 36a of the cathode separator 36 that faces the solid polymer electrolyte membrane 40, a cathode chamber 54 is formed by being cutting out in a substantially ring shape. A load application mechanism 56 that presses the cathode feed conductor 44 and the cathode electrode catalyst layer 44a against the solid polymer electrolyte membrane 40 is disposed in the cathode chamber 54.

The load application mechanism 56 includes an elastic member, for example, a plate spring 58. The plate spring 58 applies load to the cathode feed conductor 44 through a metal plate-spring holder (a shim member) 60. The cathode chamber 54 is in communication with the high pressure hydrogen manifold 38c through the hydrogen discharge passage 48c. Note that other than the plate spring 58, a disk spring or a coil spring, for example, may be used as the elastic member.

A conductive portion (a conductive member) 36e in which the high pressure hydrogen manifold 38c is formed is integrally formed in the center portion of the cathode separator 36 and is disposed between the solid polymer electrolyte membrane 40 and the cathode separator 36. Note that the conductive portion 36e may be configured separately from the cathode separator 36 and may be disposed between the cathode separator 36 and the solid polymer electrolyte membrane 40.

A conductive sheet 62 is disposed so as to extend from a portion between the conductive portion 36e and the solid polymer electrolyte membrane 40 to a portion between the cathode feed conductor 44 and the plate-spring holder 60 (the plate spring 58) in an integrated manner. The conductive sheet 62 is constituted by a metal sheet made of titanium, SUS, iron, or the like, has a ring shape, and is configured so as to have a diameter that is substantially the same as that of the cathode feed conductor 44.

An insulation member, for example, a resin sheet 63, that is positioned between the conductive sheet 62 and the solid polymer electrolyte membrane 40 is disposed at the center portion of the cathode feed conductor 44. The resin sheet 63 has a disc shape with a diameter that is slightly larger than the diameter of the conductive portion 36e and fits in the inner peripheral surface of the cathode feed conductor 44. The resin sheet 63 is configured so as to have a thickness that is substantially the same as that of the cathode feed conductor 44. For example, PEN (polyethylenenaphthalate) or polyimide film is used as the resin sheet 63.

As illustrated in FIG. 3, in the high pressure water electrolysis cell 12, a first conduction passage 64a that electrically communicates the cathode separator 36, the conductive portion 36e, the conductive sheet 62, and the cathode feed conductor 44 to each other is formed. In the high pressure water electrolysis cell 12, a second conduction passage 64b that electrically communicates the cathode separator 36, the plate spring 58, the plate-spring holder 60, the conductive sheet 62, and the cathode feed conductor 44 to each other is formed.

As illustrated in FIGS. 2 and 3, a first seal groove 65a that encircles the water supplying manifold 38a is provided in the first projection 37a of the anode separator 34. A second seal groove 65b that encircles the water discharging manifold 38b is formed in the second projection 37b of the anode separator 34. A first sealing member 66a is disposed in the first seal groove 65a while a second sealing member 66b is disposed in the second seal groove 65b.

A third seal groove 65c that encircles the inner side of the anode chamber 46 is formed in the surface 34a. A third sealing member 66c is disposed in the third seal groove 65c. A fourth seal groove 65d that encircles the outer side of the anode chamber 46 is formed in the surface 34a. A fourth sealing member 66d is disposed in the fourth seal groove 65d.

A fifth seal groove 65e that encircles the water discharging manifold 38a is formed in the first projection 37a of the cathode separator 36. A sixth seal groove 65f that encircles the water discharging manifold 38b is formed in the second projection 37b of the cathode separator 36. A fifth sealing member 66e is disposed in the fifth seal groove 65e while a sixth sealing member 66f is disposed in the sixth seal groove 65f. The seventh seal groove 65g that encircles the outside of the cathode chamber 54 is formed in the surface 36a of the cathode separator 36. A seventh sealing member 66g is disposed in the seventh seal groove 65g.

A sealing member having elasticity such as a sealing material, a cushion material, or a packing material made of, for example, EPDM, NBR, fluororubber, silicone rubber, fluorosilicone silicone rubber, isobutylene-isoprene rubber, natural rubber, styrene rubber, chloroprene rubber, or acrylic rubber is used in each of the first sealing member 66a to the seventh sealing member 66g.

As illustrated in FIG. 1, pipes 74a, 74b, and 74c that are in communication with the water supplying manifold 38a, the water discharging manifold 38b, and the high pressure hydrogen manifold 38c, respectively, are connected to the end plate 20a. The pipe 74c is provided with a back pressure valve (or a solenoid valve, not shown); accordingly, the pressure of hydrogen generated in the high pressure hydrogen manifolds 38c can be maintained at a high pressure.

An operation of the differential pressure water electrolysis system 10 configured in the above manner will be described below.

As illustrated in FIG. 1, water is supplied to the water supplying manifolds 38a of the differential pressure water electrolysis system 10 from the pipe 74a, and voltage is applied to the terminals 24a and 24b of the terminal plates 16a and 16b through the electrically connected electrolysis power source 28. Accordingly, as illustrated in FIG. 3, in each of the high pressure water electrolysis cells 12, water is supplied to the water flow paths 50a of the anode separator 34 from the water supplying manifold 38a and is moved in and along the anode feed conductor 42.

Accordingly, the water is decomposed by electricity in the anode electrode catalyst layer 42a, and hydrogen ions, electrons, and oxygen are generated. The hydrogen ions that have been generated by anodic reaction permeate the solid polymer electrolyte membrane 40, are moved to the cathode electrode catalyst layer 44a side, and are combined with the electrons such that hydrogen is obtained.

Accordingly, hydrogen flows along the hydrogen flow path in the cathode feed conductor 44. While a pressure higher than that of the water supplying manifold 38a is maintained, the hydrogen flows through the high pressure hydrogen manifold 38c so as to be capable of being drawn out to the outside of the differential pressure water electrolysis system 10. Meanwhile, oxygen and unreacted water generated by the reaction are discharged to the outside of the differential pressure water electrolysis system 10 along the water discharging manifold 38b.

In the above case, in the first exemplary embodiment, as illustrated in FIG. 3, the first conduction passage 64a that electrically communicates the cathode separator 36, the conductive portion 36e, the conductive sheet 62, and the cathode feed conductor 44 to each other is formed in the high pressure water electrolysis cell 12. Accordingly, the conduction passage in each high pressure water electrolysis cell 12 can be enlarged and energization resistance can be suppressed.

Furthermore, the second conduction passage 64b that electrically communicates the cathode separator 36, the plate spring 58, the plate-spring holder 60, the conductive sheet 62, and the cathode feed conductor 44 to each other is formed in the high pressure water electrolysis cell 12. Accordingly, sufficient contact area can be obtained in the conductive portion and, accordingly, suppression of the energization resistance is carried out in a further preferable manner.

Moreover, the resin sheet 63 is disposed between the conductive sheet 62 and the solid polymer electrolyte membrane 40. With the above, strength of the portion that abuts against the conductive portion 36e that is a portion where high pressure compression is performed can be increased; accordingly, influence on the solid polymer electrolyte membrane 40 caused by high pressure compression can be avoided and embrittlement of the conductive sheet 62 can be suppressed. Accordingly, with a simple configuration, an effect can be obtained in that formation of the desired first conduction passage 64a and second conduction passage 64b can be achieved and deterioration of the solid polymer electrolyte membrane 40 and the conductive sheet 62 can be suppressed to the extent possible.

Figure 4:
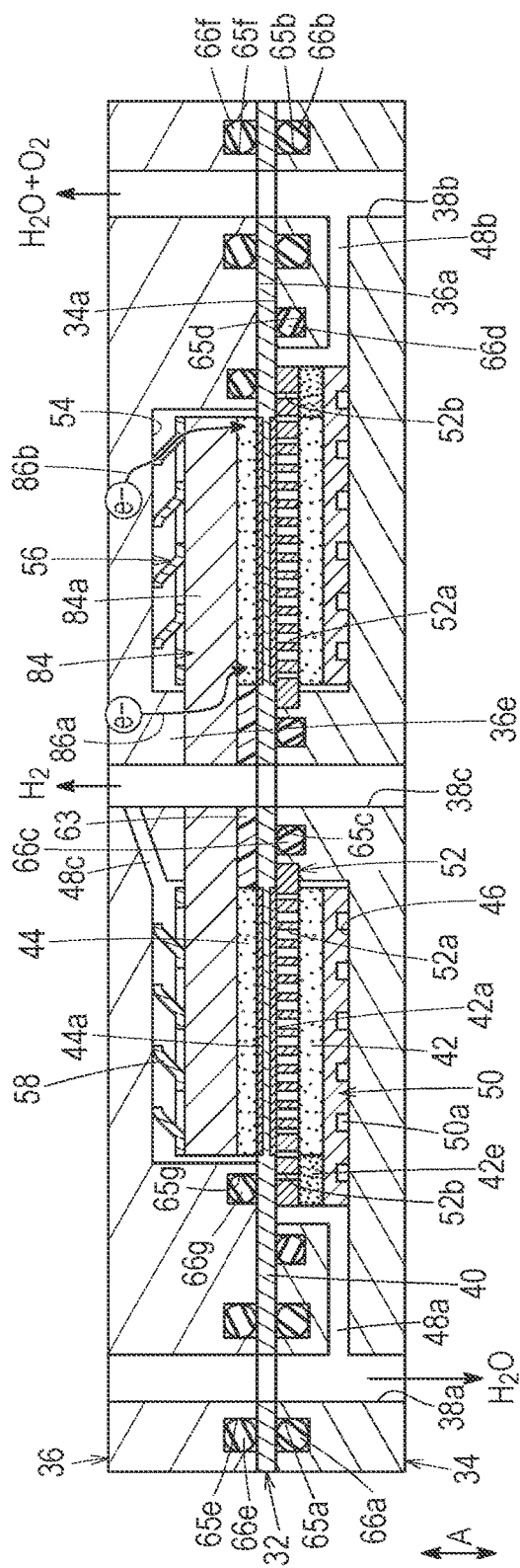
FIG. 4 is an explanatory drawing illustrating a sectional view of an essential portion of a high pressure water electrolysis cell that constitutes a differential pressure water electrolysis system according to a second exemplary embodiment of the present disclosure.

FIG. 4 is an explanatory drawing illustrating a sectional view of an essential portion of a high pressure water electrolysis cell 82 that constitutes a differential pressure water electrolysis system 80 according to a second exemplary embodiment of the present disclosure.

Note that components that are the same as those of the differential pressure water electrolysis system 10 according to the first exemplary embodiment will be attached with the same reference numerals and detailed description thereof is omitted. Furthermore, the same applies to a third exemplary embodiment described below and detailed description thereof is omitted.

The high pressure water electrolysis cell 82 includes a conductive sheet 84 that has a ring shape, that is configured so as to have a diameter that is substantially the same as that of the cathode feed conductor 44, and that is thicker than the conductive sheet 62 of the first exemplary embodiment. The conductive sheet 84 is disposed so as to extend from a portion between the conductive portion 36e and the solid polymer electrolyte membrane 40 to a portion between the cathode feed conductor 44 and the plate spring 58 in an integrated manner.

The conductive sheet 84 is configured so as to have a thickness amounting to the thickness of the plate-spring holder 60 of the first exemplary embodiment, and a plate spring 58 directly abuts against the conductive sheet 84. The conductive sheet 84 includes a shim function portion 84a in which the plate spring 58 is disposed.

In the high pressure water electrolysis cell 82, a first conduction passage 86a that electrically communicates the cathode separator 36, the conductive portion 36e, the conductive sheet 84, and the cathode feed conductor 44 to each other is formed. In the high pressure water electrolysis cell 82, a second conduction passage 86b that electrically communicates the cathode separator 36, the plate spring 58, the conductive sheet 84, and the cathode feed conductor 44 to each other is formed.

The second exemplary embodiment configured in the above manner can obtain effects that are similar to those of the first exemplary embodiment described above. Moreover, the conductive sheet 84 integrates the shim function portion 84a therewith and is configured with a considerable thickness; accordingly, resistance can be reduced further. Additionally, the plate-spring holder 60 is unneeded and the number of components can be reduced; accordingly, the configuration can be simplified.

FIG. 5 is an explanatory drawing illustrating a sectional view of an essential portion of a high pressure water electrolysis cell 92 that constitutes a differential pressure water electrolysis system 90 according to a third exemplary embodiment of the present disclosure.

The high pressure water electrolysis cell 92 includes a conductive sheet 94 that has a ring shape and that is configured so as to have a diameter that is substantially the same as that of the cathode feed conductor 44. The conductive sheet 94 is disposed so as to extend from a portion between the conductive portion 36e and the solid polymer electrolyte membrane 40 to a portion between the cathode feed conductor 44 and a holder 96 in an integrated manner. The conductive sheet 94 is porous and includes micro-pores through which hydrogen gas and water can permeate.

A load application mechanism 98 that presses the cathode feed conductor 44 and the cathode electrode catalyst layer 44a against the solid polymer electrolyte membrane 40 is disposed in the cathode chamber 54. The load application mechanism 98 includes the holder 96 and elastic members, such as a plurality of rubber members 100. The holder 96 has a ring plate shape, and a plurality of ring-shaped groove portions 102 are formed in a concentric manner with respect to the center of the holder 96. Hydrogen introduction hole portions 104 penetrating in the thickness direction is provided in the bottom portion of each of the groove portions 102. A rubber member 100 is disposed in each of the groove portions 102, and each rubber member 100 protrudes out from the surface of the holder 96 and abuts against the inner surface of the cathode separator 36.

In the high pressure water electrolysis cell 92, a conduction passage 106 that electrically communicates the cathode separator 36, the conductive portion 36e, the conductive sheet 94, and the cathode feed conductor 44 to each other is formed.

The third exemplary embodiment configured in the above manner can obtain effects that are similar to those of the first exemplary embodiment described above. Moreover, the rubber members 100 that are elastic members can be suppressed from deteriorating; accordingly, reduction of cost is facilitated.

A differential pressure water electrolysis system according to the present disclosure includes a high pressure water electrolysis cell. The high pressure water electrolysis cell includes an electrolyte membrane, and an anode feed conductor is provided on one side and a cathode feed conductor is provided on the other side of the electrolyte membrane.

An anode separator is disposed so as to oppose the anode feed conductor, the anode separator is provided with an anode chamber that accommodates the anode feed conductor and generates oxygen by electrolyzing water that has been supplied. A cathode separator is disposed so as to oppose the cathode feed conductor, the cathode separator is provided with a cathode chamber that accommodates the cathode feed conductor and, by electrolyzing water, generates hydrogen that has a pressure that is higher than that of the oxygen. An elastic member that applies a load in a stacking direction is provided between the cathode feed conductor and the cathode separator.

A hydrogen manifold through which the hydrogen flows is formed in the high pressure water electrolysis cell so as to penetrate the center portions of the anode feed conductor and the cathode feed conductor. A plurality of high pressure water electrolysis cells are stacked and fastened in the stacking direction such that the differential pressure water electrolysis system is configured.

Furthermore, the differential pressure water electrolysis system includes a conductive member, a sealing member, a conductive sheet, and an insulation member. The conductive member forms a hydrogen manifold and is disposed between the cathode separator and the electrolyte membrane, and the sealing member is disposed so as to encircle and seal the cathode chamber. The conductive sheet is disposed so as to extend from a portion between the conductive member and the electrolyte membrane to a portion between the cathode feed conductor and the elastic member in an integral manner. The insulation member is disposed in the center portion of the cathode feed conductor and between the conductive sheet and the electrolyte membrane.

Furthermore, in the differential pressure water electrolysis system, the conductive sheet preferably integrally includes a shim function portion against which the elastic member abuts.

Furthermore, in the differential pressure water electrolysis system, the elastic member is preferably a metallic spring.

Still further, in the differential pressure water electrolysis system, the elastic member is preferably a rubber member and a through hole is preferably formed in the conductive sheet in an area corresponding to an area sealed by the elastic member.

According to the present disclosure, the conduction passage that electrically communicates the cathode separator, the conductive member, the conductive sheet, and the cathode feed conductor to each other is formed. Accordingly, the conduction passage can be enlarged and energization resistance can be suppressed. Moreover, the insulation member is disposed between the conductive sheet and the electrolyte membrane. Accordingly, strength of the portion where high-pressure compression is performed can be increased; accordingly, influence on the electrolyte membrane caused by high pressure compression can be avoided and embrittlement of the conductive sheet can be suppressed.

With the above, a desired conduction passage can be formed and deterioration of the electrolyte membrane and the conductive sheet can be suppressed to the extent possible, with a simple configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure water electrolysis system, comprising:
a high pressure water electrolysis cell including
an electrolyte membrane,
an anode feed conductor provided on one side and a cathode feed conductor provided on the other side of the electrolyte membrane,
an anode separator disposed so as to oppose the anode feed conductor, the anode separator being provided with an anode chamber in which the anode feed conductor is accommodated and generating oxygen by electrolyzing water that has been supplied thereto,
a cathode separator disposed so as to oppose the cathode feed conductor, the cathode separator being provided with a cathode chamber in which the cathode feed conductor is accommodated and, by electrolysis of the water, generating hydrogen that has a pressure that is higher than that of the oxygen,
an elastic member that is disposed between the cathode feed conductor and the cathode separator and that applies a load in a stacking direction, and
a hydrogen manifold through which the hydrogen flows being formed in the high pressure water electrolysis cell by penetrating center portions of the anode feed conductor and the cathode feed conductor, wherein a plurality of the high pressure water electrolysis cells are stacked and fastened in a stacking direction;
a conductive member that forms the hydrogen manifold and that is disposed between the cathode separator and the electrolyte membrane;
a sealing member that is disposed so as to encircle and seal the cathode chamber;
a conductive sheet that is disposed so as to extend from a portion between the conductive member and the electrolyte membrane to a portion between the cathode feed conductor and the elastic member in an integrated manner; and an insulation member that is disposed in the center portion of the cathode feed conductor and between the conductive sheet and the electrolyte membrane.

2. The differential pressure water electrolysis system according to claim 1, wherein
the conductive sheet integrally includes a shim function portion against which the elastic member abuts.

3. The differential pressure water electrolysis system according to claim 1, wherein
the elastic member is a metallic spring.

4. The differential pressure water electrolysis system according to claim 1, wherein
the elastic member is a rubber member, and
a through hole is formed in the conductive sheet in an area corresponding to an area sealed by the elastic member.

5. A differential pressure water electrolysis system, comprising:
high pressure water electrolysis cells stacked and fastened in a stacking direction, each of the high pressure water electrolysis cells comprising:
an electrolyte membrane having a first side and a second side opposite to the first side in the stacking direction;
an anode feed conductor provided on the first side of the electrolyte membrane;
a cathode feed conductor provided on the second side of the electrolyte membrane;
an anode separator disposed so as to face the anode feed conductor and having an anode chamber in which the anode feed conductor is accommodated and oxygen is generated via electrolysis of water that has been supplied into the anode chamber;
a cathode separator disposed so as to face the cathode feed conductor and having a cathode chamber in which the cathode feed conductor is accommodated and hydrogen that has a pressure higher than a pressure of the oxygen is generated via the electrolysis of the water;
an elastic member disposed between the cathode feed conductor and the cathode separator to apply a load in the stacking direction;
a hydrogen manifold through which the hydrogen flows and which extends through center portions of the anode feed conductor and the cathode feed conductor;
a conductive member disposed between the cathode separator and the electrolyte membrane to provide the hydrogen manifold;
a sealing member disposed so as to encircle and seal the cathode chamber;
a conductive sheet disposed so as to extend from a first portion between the conductive member and the electrolyte membrane to a second portion between the cathode feed conductor and the elastic member; and an insulation member disposed in the center portion of the cathode feed conductor and between the conductive sheet and the electrolyte membrane.

6. The differential pressure water electrolysis system according to claim 5,
wherein the conductive sheet integrally includes a shim function portion against which the elastic member abuts.

7. The differential pressure water electrolysis system according to claim 5,
wherein the elastic member includes a metallic spring.

8. The differential pressure water electrolysis system according to claim 5, wherein the elastic member includes a rubber member, and
wherein a through hole is provided in the conductive sheet in an area corresponding to an area sealed by the elastic member.

9. The differential pressure water electrolysis system according to claim 5,
wherein each of the high pressure water electrolysis cells comprises a protection sheet member interposed between the anode feed conductor and the electrolyte membrane.

10. The differential pressure water electrolysis system according to claim 5, wherein the conductive sheet is porous and includes micro-pores so that the hydrogen and the water permeate through the micro-pores.

11. The differential pressure water electrolysis system according to claim 1, wherein
the conductive sheet includes a portion against which the elastic member abuts.

12. The differential pressure water electrolysis system according to claim 1,
wherein the conductive sheet is porous.

13. The differential pressure water electrolysis system according to claim 1,
wherein the insulation member is disposed inward of the cathode feed conductor relative to a center of the high pressure water electrolysis cell, the insulation member being disposed between the conductive sheet and the electrolyte membrane in the stacking direction.

14. The differential pressure water electrolysis system according to claim 5,
wherein the conductive sheet includes a portion against which the elastic member abuts.

15. The differential pressure water electrolysis system according to claim 5,
wherein the conductive sheet is porous.

16. The differential pressure water electrolysis system according to claim 5,
wherein the insulation member is disposed inward of the cathode feed conductor relative to a center of the high pressure water electrolysis cell, the insulation member being disposed between the conductive sheet and the electrolyte membrane in the stacking direction.

* * * * *